United States Patent
Rao

(10) Patent No.: US 8,218,477 B2
(45) Date of Patent: Jul. 10, 2012

(54) METHOD OF DETECTING WIRELESS NETWORK FAULTS

(75) Inventor: Sudarshan A. Rao, Highland Park, NJ (US)

(73) Assignee: Alcatel Lucent, Paris (FR)

( * ) Notice: Subject to any disclaimer, the term of this patent is extended or adjusted under 35 U.S.C. 154(b) by 1959 days.

(21) Appl. No.: 11/095,011

(22) Filed: Mar. 31, 2005

(65) Prior Publication Data

US 2006/0221886 A1 Oct. 5, 2006

(51) Int. Cl.
*H04Q 7/00* (2006.01)

(52) U.S. Cl. ........ 370/328; 370/331; 370/332; 370/333; 370/334; 455/429; 455/440; 455/446; 455/449; 455/453

(58) Field of Classification Search .................. 370/328, 370/338, 241, 230.1, 237, 217, 242, 245, 370/252, 238; 455/8, 453, 428, 421
See application file for complete search history.

(56) References Cited

U.S. PATENT DOCUMENTS

| | | | |
|---|---|---|---|
| 6,125,274 A | | 9/2000 | Komives et al. |
| 6,141,566 A * | | 10/2000 | Gerdisch et al. ........... 455/562.1 |
| 6,327,677 B1 * | | 12/2001 | Garg et al. ...................... 714/37 |
| 6,904,013 B2 * | | 6/2005 | Skoog et al. .................. 370/217 |
| 7,069,009 B2 * | | 6/2006 | Li et al. .......................... 455/446 |
| 7,142,868 B1 * | | 11/2006 | Broyles et al. ................ 455/453 |
| 2002/0111161 A1 * | | 8/2002 | Bourlas et al. ................ 455/423 |
| 2003/0235187 A1 * | | 12/2003 | Iwama et al. .................. 370/352 |
| 2004/0092287 A1 * | | 5/2004 | Hori et al. .................. 455/552.1 |
| 2004/0171407 A1 * | | 9/2004 | Ninomiya ..................... 455/561 |
| 2004/0214583 A1 * | | 10/2004 | Graham et al. ............... 455/453 |
| 2005/0018611 A1 * | | 1/2005 | Chan et al. .................... 370/241 |
| 2005/0135313 A1 * | | 6/2005 | Gandhi et al. ................ 370/335 |

* cited by examiner

*Primary Examiner* — Dai A Phuong
(74) *Attorney, Agent, or Firm* — Carlson, Gaskey & Olds PC

(57) ABSTRACT

A wireless communication system includes the ability to determine that a fault condition associated with at least a portion of a cell associated with a base station is likely. Disclosed examples include using information regarding call activity levels of various portions of a cell for determining an expected call activity level for at least one portion of the cell. One example includes using the least active portion of the cell as the portion of interest. Previously observed activity levels provide information to automatically determine an expected relationship between the activity levels of the portions of the cell. Disclosed examples include determining whether a deviation between the actual call activity level and the expected call activity level is statistically significant enough to indicate a fault condition with at least the portion of the cell, which is of interest.

22 Claims, 1 Drawing Sheet

METHOD OF DETECTING WIRELESS NETWORK FAULTS

FIELD OF THE INVENTION

This invention generally relates to telecommunications. More particularly, this invention relates to wireless communication systems.

DESCRIPTION OF THE RELATED ART

Wireless communication networks are well known and increasing in popularity. Mobile stations such as cell phones, personal digital assistants, and notebook computers wirelessly communicate through base stations to a wireless communication network, which operates in a known manner. Each base station is associated with a particular geographic region, typically referred to as a cell. Cells are generally divided into a plurality of sectors.

With the increasing popularity and increased competition in the wireless communication industry, system reliability and availability to the end customer is becoming increasingly important. A significant challenge facing designers and operators of wireless communication systems is how to maintain or improve reliability and availability without undesirably increasing expenses associated with the system.

One aspect of maintaining high reliability and availability is associated with fault detection. If faults occur in the operation of a wireless communication network, that decreases the availability and reliability of the system. Fault detection in wireless communications systems is complex. The nature of such systems, including the number of base stations, their geographical distribution across a wide area, and the nature of wireless links used for communicating with mobile stations require relatively complex and sophisticated fault detection and recovery schemes.

Most approaches to fault detection and error recovery in wireless communication systems require significant human intervention, which introduces additional labor and expense. With the traditional approach, specifically designed fault traps are set for detecting software or hardware faults. For example, various hardware alarms exist to identify detrimental hardware conditions. A high-temperature alarm incorporating a thermal sensor is one example hardware alarm device. A software error log written by a software developer to catch a particular error condition is an example software fault trap.

Traditional approaches are capable of identifying deviations in system operation from the architectural design but these are limited to detecting errors that were anticipated and for which a specific or dedicated alarm was properly implemented. Further, known techniques are limited to detecting localized faults and are only capable of identifying specific fault conditions ultimately addressed by human intervention through appropriate parameter setting, for example.

In addition to the expenses associated with the tedious and time-consuming human intervention that is required with traditional fault detection approaches, wireless system operation does not lend itself to comparison with simple threshold values, for example. The use of a wireless communication network varies over time through a day or depending on the season, for example. Therefore, an entire cell may be silent for a significant period of time even though the cell is entirely functional as designed. It is not possible to simply detect whether there is activity within a cell to determine whether the cell has a fault or is fully operational. More sophisticated approaches are required.

For example, a cell or a sector of a cell may be silent for an extended period based on normal daily traffic variations, especially at night or lean hours of the early morning. During any given day, a particular sector may experience fluctuations in traffic volumes during normal morning rush hour times, afternoon lulls, late afternoon rush hour times, night life traffic and late night lulls. Further, the use of the wireless communication system varies at different times of a day, depending on the day of the week or the season of the year. Seasonal variations will dictate how one particular sector may carry more traffic during a holiday season, for example.

Additionally, different sectors within a single cell may be facing different directions and experience different silent periods. Other sectors may be geographically located in a region that experiences periodic large increases in traffic when there otherwise normally is very little traffic. One example of such a sector is a sector that includes a sports stadium where the amount of traffic just before, during and immediately after a sporting event is significantly higher than at other times. Other sectors in the same cell may have much more consistent traffic patterns during those same times.

Moreover, the typical traffic associated with one cell or sector may differ radically from another cell or sector for other reasons that may change over time, for example. This may occur in instances where a geographic region becomes more densely populated over time.

Fault detection within a wireless communication network is further complex because the types of potential failures at a base station are numerous. Hardware breakdowns may occur in transmit amplifiers, receive amplifiers or radio components, for example. Software bugs and failures may cause abnormal system behavior. Additionally, overload conditions or environmental conditions may lead to antenna failures, cable corrosion, power outages, RF signal jamming, among other problems.

The type of failure dictates the corresponding effect or fault within the system. The fault may be limited to a single carrier or may effect an entire sector and, in some cases, an entire base station. For example, a base station in a CDMA system having only one carrier and a radio that supports a pilot channel of a sector that fails renders the entire sector inoperable. Other sectors of that base station, however, are not affected by such a fault and the fault may not be noticed for a considerable time.

Further, there are hard or complete faults and soft or intermittent faults or degradations that require detection. Hard faults are easier to detect than soft faults. Both types, however, are important to detect because they both interfere with the ability to provide reliable, high quality service and availability. If soft faults continue undetected, they result in lost revenue to a provider.

All of the mentioned factors contribute to the difficulties associated with diagnosing fault conditions including effectively discriminating between truly faulty conditions and normal traffic variations within a cell or sector.

One advance in detecting fault conditions is shown in U.S. Pat. No. 6,125,274. In that patent, a distribution of receipts at each of a plurality of radios, which are supposed to have a uniform (or nearly uniform) distribution of receipts, provides an indication of a fault condition at one of the radios. A uniform distribution of wireless communication activity cannot be assumed or controlled in many situations as noted above. There is still a need for improved fault detection techniques.

This invention addresses the need for detecting faults in a wireless communication system that is effective and economical and does not depend on any particular preset distribution of call activity levels among various portions of a cell.

SUMMARY OF THE INVENTION

An exemplary disclosed method of communicating includes determining an expected relationship between call activity levels for a plurality of portions of a cell based on observing actual call activity levels during a learning time. The determined expected relationship allows for determining an expected call activity level for a first portion of a cell based on an actual call activity level of at least one other portion of the cell. When an actual call activity level of the first portion is significantly different from the expected call activity level, the first portion is identified as having a fault condition.

One example includes determining which portion of the cell has the least amount of call activity and using that portion as the first portion of the cell for purposes of determining whether a fault condition exists.

One example includes monitoring an entire cell or an entire base station. Another example includes monitoring sectors as the portions of the cell for purposes of fault detection. Another example includes monitoring carriers or frequencies associated with a base station for purposes of detecting faults.

The various features and advantages of this invention will become apparent to those skilled in the art from the following detailed description. The drawings that accompany the detailed description can be briefly described as follows.

DETAILED DESCRIPTION

Figure 1:
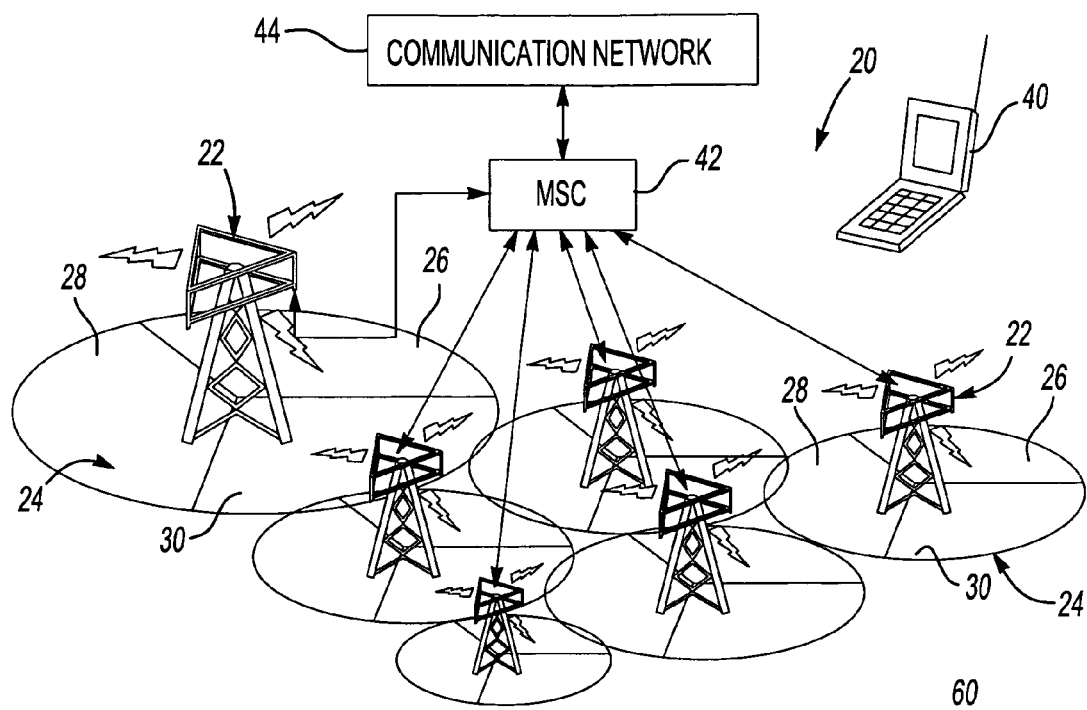
FIG. 1 schematically shows selected portions of a wireless communication network.

FIG. 1 schematically shows a wireless communication system 20. A plurality of base stations 22 are arranged to provide radio frequency coverage for a corresponding plurality of geographic regions or cells 24. The example cells 24 are divided into a plurality of sectors 26, 28 and 30 in a known manner.

Depending on the location of one or more mobile stations 40, at least one of the base stations 22 will communicate with the mobile station 40. The appropriate base station 22 communicates with a mobile switching center 42, which is associated in a known manner with a wireless communication network 44 that operates as known.

Figure 2:
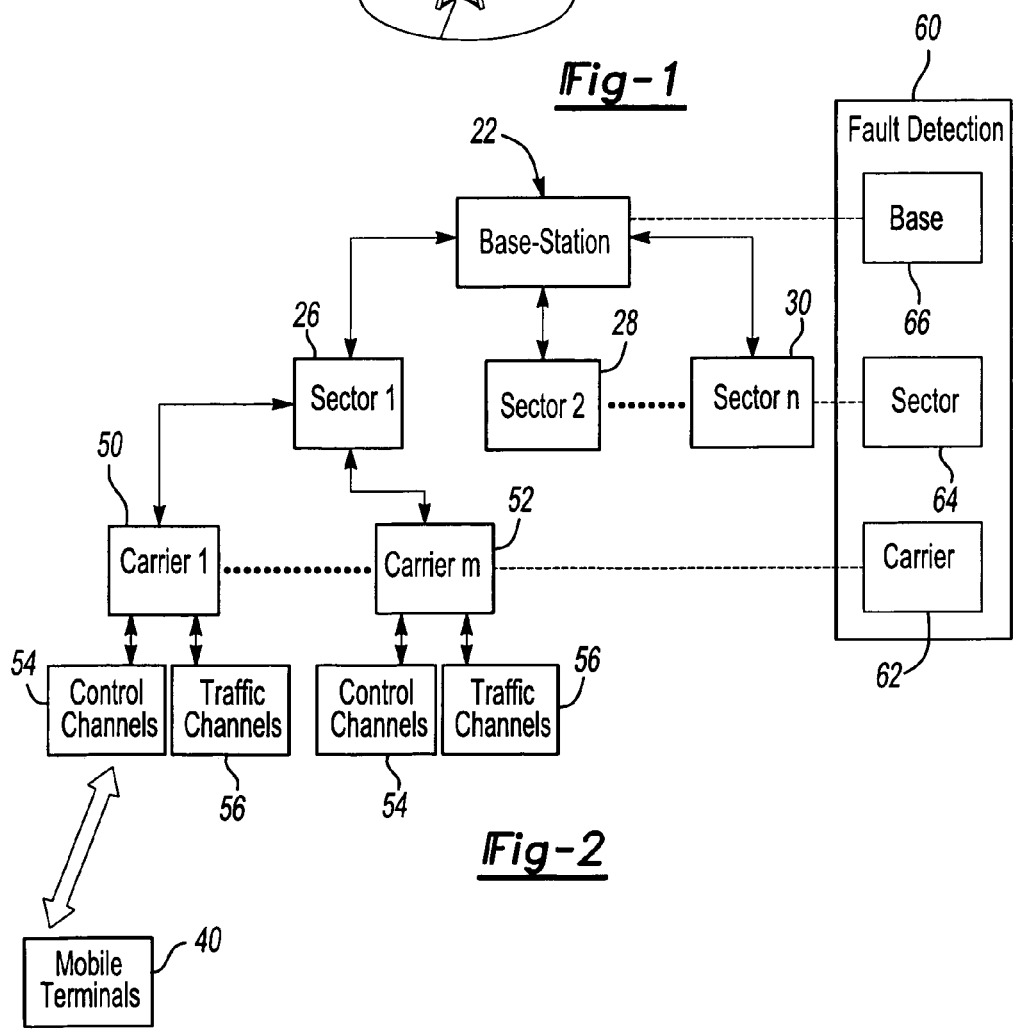
FIG. 2 schematically shows an example implementation of a fault detection strategy designed according to an embodiment of this invention.

One example system includes the capability of detecting a fault condition with one or more of the base stations 22, for example. FIG. 2 schematically shows a base station 22 and an associated plurality of sectors 26, 28 and 30. As known, each sector includes a plurality of carriers 50, 52 that have assigned frequencies for communicating between the base station 22 and one or more mobile stations 40. Each carrier includes a plurality of control channels 54 and traffic channels 56 as known. A particular mobile station 40 will be assigned, in a known manner, to a particular control channel 54 and traffic channel 56 of a selected one of the carriers 50, 52, depending on which sector 26, 28, 30 the mobile station is within or closest to, for example.

The example of FIG. 2 includes a fault detection module 60 associated with the base station 22. In one example, each base station has a dedicated fault detection module 60. Such an arrangement has the advantage of limiting the amount of information conveyed between the base station 22 and the mobile switching center 42 for purposes of fault detection and management. In another example, one or more fault detection modules are implemented at a level similar to the mobile switching center 42 such that each fault detection module is responsible for more than one base station.

The fault detection module 60 in one example comprises software, firmware, hardware or a combination of them. Given this description, those skilled in the art will be able to arrange components and to develop programming to meet the needs of their particular situation.

In one example, the fault detection module 60 utilizes a statistical approach to detecting fault conditions or potential fault conditions associated with one or more portions of the base station 22. In this example, the base station or cell can be considered to be divided into portions at various levels. This description uses the designations "portions of a base station" and "portions of a cell" in a synonymous or interchangeable manner in as much as a base station is considered, for purposes of discussion, to correspond to a geographic region or area of coverage called a cell. At one level, for purposes of discussion, each carrier 50, 52 is considered a portion of the base station that can be monitored for purposes of fault detection. At another level, each sector 26, 28, 30 is considered a portion of the base station for purposes of discussion and provides a basis for fault detection.

The example fault detection module 60 includes a carrier level fault detection module 62. A fault or error condition associated with the base station 22 may result in or be caused by a fault on one or more of the carriers 50, 52. The carrier level fault detection module 62 in this example is capable of detecting such faults.

Assuming that the sector 26 has N carriers and utilizes a carrier assignment algorithm that is designed to distribute the load or traffic within the sector 26 uniformly across the available carriers and channels, the carrier level fault detection module 62 utilizes statistical information regarding a call level activity on each carrier for purposes of determining whether a fault condition exists. In one example, a counter is associated with or dedicated to each carrier and increments a count each time a successful call set-up takes place on the corresponding carrier. When an associated radio is not functioning properly, for example, the process of registration and call set-up for mobile stations will not even begin and the corresponding counter will not increment. Therefore, different call activity levels on different carriers will provide different counter numbers that are processed by the carrier level fault detection module 62. Other examples use one or more indicators of call activity levels other than a call set-up.

Given a uniform loading channel assignment algorithm for the carriers 50 and 52, the long term expected probability of call arrivals (i.e., an indication of call activity level) on any carrier is $p_{exp}=1/N$; where, N is the number of carriers and $p_{exp}$ is the expected probability distribution on each carrier. Non-uniform loading of carriers is also easily dealt with similarly when the loading across carriers is weighted by some known factor "w_i", which is usually known a-priori, for each carrier I such that the sum of w_i's is equal to 1. Further, in this example, it is safe to assume that the probability of more than one simultaneous carrier failure is unlikely. In the case of simultaneous failures of all carriers within a sector, a sector level fault detection scheme as described below will detect the fault condition.

In one example, the carrier level fault detection module 62 periodically determines at least two values. One value, S, is the sum of all of the counters (i.e., the total call activity level). This sum can be described by the equation:

$$S = \sum_{i=1}^{N} n_i = \text{sum of all the counters.}$$

The other value that the carrier level fault detection module 62 periodically determines is the lowest count of all of the counters, $n_{lo}$. The expected number of arrivals recorded on each carrier, $n_i$ should be approximately equal to S/N. Any carrier that deviates significantly from this expected value may be doing so because of a fault condition. The carrier level fault detection module 62 determines a test statistic TS as a measure of the discrepancy between the actual call activity level for a carrier and the expected call activity level. In one example, the test statistic TS is described by the following equation:

$$TS = \frac{((S/N) - n_{lo})^2}{(S/N)} \quad \text{(Eq. 1)}$$

In one example, the test statistic TS is $X^2$ distributed. In this example, the carrier level fault detection module 62 poses a null hypothesis $H_0$, that the carrier associated with $n_{lo}$, is functioning properly. Then, the empirical data from the counters is used to show that the null hypothesis is incorrect (i.e., that the carrier is suffering from a fault condition), with a certainty $\alpha$, when the value TS>$X^2_\alpha$, where $X^2_\alpha$ is the upper $\alpha$ point of the $\chi^2$ distribution, wherein the degrees of freedom are equal to N−1.

In one example, for a given $\alpha$ and N, $X_\alpha^2$ can be determined from the $\chi^2$ formula:

$$F(\chi^2) = \int_0^{\chi^2} \frac{1}{2^{n/2}\Gamma(n/2)} x^{\frac{n-2}{2}} e^{\frac{-x}{2}} dx$$

The certainty factor $\alpha$ a may be selected to provide a reliability of the fault detection technique. The certainty factor $\chi$ effectively controls what portion of the statistical distribution is used to indicate a fault condition. In one example, $\chi$ is set to use the "tails" of the distribution. In other words, the certainty factor may be selected to provide a desired degree of certainty that a detected fault as determined by the fault detection module 60 is, indeed, a fault condition. In one example, the certainty factor $\alpha$ is set at 0.95. In another example, the certainty factor $\alpha$ is set at 0.9999. Given this description, those skilled in the art will be able to select an appropriate certainty factor to meet the needs of their particular situation.

In one example, it is safe to assume that a carrier hard fault condition will result in no activity on the associated carrier. Under such conditions, the carrier or portion of the base station having the lowest call activity level will have an associated value $n_{lo}$=0. The following equation provides the minimum sum S at which the carrier level fault detection module 62 declares a fault with the corresponding carrier.

$$S_{min} = \min\left\{ S : \binom{S}{n_{lo}=0} p_{exp}^{n_{lo}}(1-p_{exp})^{S-n_{lo}} \le \alpha \right\}$$

In one example, the known, expected distribution across the carriers provides a parametric statistical test that does not require additional data for learning or inferring an expected distribution of call activity levels across the carriers. The disclosed technique is equally applicable to carrier distribution techniques that intentionally bias the load on one or more carriers by a known or predetermined factor. Such arrangements include an expected distribution that is known $\alpha$-priori and the above-described technique can be implemented. Given this description, those skilled in the art will be able to make any modifications to the disclosed technique to address the particular needs of their particular situation.

The time required for the carrier level fault detection module 62 to detect a fault condition is determined in one example by assuming that the average arrival rate of calls (i.e., an indication of call activity level) for each carrier in the sector is $\lambda$, the number of channels is N and $p_{exp}$=1/N. The time to detect a fault can be described by the following equation:

$$t_D = N\chi_\alpha^2/\lambda$$

In such an example, the fault detection time decreases as the arrival rate $\lambda$ increases. As the number of carriers N increases, the time to detect faults increases for a given value of $\lambda$. In one example, the carrier level fault detection module 62 determines $t_D$ based upon the empirical information from the counters counting call setups on each carrier.

In one example, the carrier assignment algorithm allows for predetermining thresholds used for declaring fault conditions. For example, the equation for $S_{min}$ given above and known probabilities or expectations per carrier allows for generating a look up table of appropriate thresholds such as $t_D$. In such an example, there is less of a computation burden on a processor carrying out the functions of the carrier level fault detection module 62.

The fault detection module 60, and more particularly the carrier level fault detection module 62, utilizes information regarding the call activity level for each carrier (i.e., portion) of the base station or cell to determine an expected call activity level for at least one of the carriers. Using the statistical approach described above, the carrier level fault detection module 62 determines whether a difference between the call activity level for at least one of the carriers and an expected call activity level for that carrier, which is based on the call activity level of at least some of the other carriers, is significant enough to indicate a fault with at least the one carrier.

Under some circumstances, none of the carriers 50, 52 within a sector will have any call activity when there is a sector-level fault condition. The illustrated example includes a sector level fault detecting module 64 for detecting such conditions.

The example sector level fault detection module 64 utilizes information regarding call activity levels for at least a plurality of sectors 26, 28, 30 to determine an expected call activity level for the least active sector and then determines whether a deviation from that expected call activity level is significant enough to indicate a fault with the corresponding sector.

In the illustrated example, each cell 24 has three sectors 26, 28 and 30. There are a variety of factors that indicate a call activity level for a sector such as call originations within a sector, handoff between sectors within a base station and handoffs involving a neighboring base station. One example embodiment uses at least one of such factors for purposes of determining a call activity level for each sector.

In one example, the sector level fault detection module 64 utilizes call activity level for each sector to determine an expected call activity level and utilizes information gathered regarding expected call distributions between the sectors, which may vary from time to time. The example implementation of carrier level detection described above included a known or expected distribution between carriers (i.e., uniform load distribution). Because conditions at sectors may vary from time to time, such an α-priori distribution or relationship between the sectors may not always be available. One example implementation of this invention includes observing activity in each of the sectors over a period of time to learn an expected distribution pattern, assuming that each sector is performing as desired during the learning period.

The equation $p_i=p_N/(M-1)\gamma$ describes a probability $p_i$ of call activity level (i.e., call originations) in sector i and the total probability of call activity levels (i.e., call originations) $p_N$ in M−1 neighboring sectors within the same base station; where $\gamma$ is the average load imbalance factor between the sector i of interest and the neighboring sectors within the same base station and M is the number of sectors associated with a base station (i.e., M=3 in the illustrated example).

The value of $\gamma$ will vary over time depending on traffic patterns associated with the different sectors of a cell. If traffic distribution in all sectors associated with a base station is uniform and there is essentially no traffic imbalance, then $p_i=1/M$ and $p_N=(M-1)/M$.

One example includes determining a worst case value for $\gamma$, which is denoted in this description as $\gamma_{max}$. In one example, the hypothesis $p_i \geq p_N/(M-1)\gamma_{max}$ represents a null hypothesis (i.e., the sector i under consideration is operating properly). The relationship $p_i < p_N/(M-1)\gamma_{max}$ expresses a hypothesis that the sector under consideration has a fault.

One example includes detecting hard faults by counting the total number S of call originations (i.e., call activity level) in the neighboring sectors of a sector i within a base station when the sector i has no call originations. An appropriate threshold useful for determining when the sector i of interest having no call origination includes a fault condition is described by the following equation:

$$S^*(\gamma) = \min\left\{S : \binom{S}{n_{lo}=0} p_i^{n_{lo}}(1-p_i)^{S-n_{lo}} \leq \alpha\right\}$$

In one example, the observed call activity level $S>S^*(\gamma)$, then a fault likely exists. Empirical data is used (in a similar manner to that described above with regard to the operation of the example carrier level fault detection module 62), for testing the hypothesis whether there is a fault. One example includes presetting an initial fault threshold that may be useful for a majority of base stations. In one example, it is assumed that the worst case expected imbalance is 10:1 (i.e., $\gamma_{max}=10$). For some such examples, $S^*(\gamma)=300$, if M=3 and $\alpha=10^{-5}$.

For many cells, traffic patterns change with time of day, day of week and time of year such that the sector level fault detection module 64 learns and estimates the worst case expected imbalance for each sector relative to the other sectors. One example includes utilizing a period of between about two weeks and three weeks for data collection, learning and estimation of traffic patterns of sectors within a cell. During this time, worst case imbalances expected during normal operation are observed. Once the worst case values are obtained, the fault threshold value can be set with a desired safety margin above the worst case that was observed.

One example includes assuming a Poisson arrival process and a learning period of two to three weeks. In this instance, $\gamma=P_N/P_i$, which can be approximated as $\gamma=\lambda_N^{total}(t).\Delta t/\lambda_i^{total}(t).\Delta t$, where $\Delta t$ is on the order of the worst case inter-arrival times of calls in a sector i. One example includes determining only the maximum value and then using it with a selected margin to set the threshold or thresholds for fault declaration.

One example includes detecting when a sector i has no call activity (i.e., zero calls or accesses). The total number of calls or accesses on neighboring sectors is determined while the sector i has no call activity. As soon as a call or access takes place in the sector i, the total number representing call activity level in the neighboring sectors is retained. One example includes retaining N largest values of the number of calls occurring in other sectors while the sector i is silent. These values are equivalent to N tail values of the following distribution: $f(Sn>=N/Stest=0)$.

Such a technique allows for adaptively setting the thresholds regarding load balance between sectors based upon actual call activity levels over a given time period. One example includes periodically updating the thresholds based upon new learning data collected by the sector level fault detection module 64. One example includes updating the fault declaration thresholds about once a month. Given this description, those skilled in the art will be able to select an appropriate interval at which to update a threshold and an appropriate time sufficient to gather enough data for learning what the expected distribution and threshold should be.

As can be appreciated from the preceding paragraphs, the illustrated example includes utilizing call activity level information from neighboring sectors for determining whether a detected call activity level for a given sector (i.e., the least active sector associated with a base station) is statistically significant when it deviates from an expected call activity level for purposes of declaring a fault condition for that sector. The disclosed example statistical approach allows for determining a variety of fault conditions for one or more sectors associated with a base station.

The example of FIG. 2 includes a base station level fault detection module 66. In one example, this module utilizes information from at least one of the other modules 64 or 62 to determine when there is no activity on all carriers or all sectors, which indicates that the entire base stations is effectively silent. In one example, the base station level fault detection module 66 determines when no calls or accesses have been received on all sectors associated with a base station for an extended time, which provides an indication that the entire base station is inoperable.

Because it is possible for a base station to be silent during periods when no calls are placed, a silent base station is not necessarily a faulty one. In one example, the base station level fault detection module 66 determines the largest times when the base station is silent, $T_S$, observed during a training period. The largest silent time $T_S$ is used in one example as a guide to set thresholds for determining when a silent base station is a faulty base station. In one example, a threshold is selected according to the following relationship: $T_S^* \geq \delta T_S$, where the value of δ depends on the confidence level required before indicating a fault and wherein δ>1 to provide a reasonable margin over and above the largest silent time $T_s$.

One example includes a modified version of a Chernoff bound $$P_{false-alarm}=P(T_{obs} \geq T_S^*) \leq \alpha$$

as shown by the following equation:

$$P([T_{obs} - T_S \geq \delta T_S]) \leq e^{-\left(\frac{T_S(\delta)^2}{2}\right)}$$

One example includes using different thresholds depending on the time of day. One example includes having a busy hour threshold and a non-busy hour threshold, each of which is associated with a selected number of consecutive hours during which the information gathered during a training period indicates a significantly expected difference in the expected times when a base station may be silent. For example, during busy hours, almost no silent periods will be below a threshold and during non-busy periods many silent times will be below a corresponding threshold to avoid a false fault declaration.

The disclosed example provides various ways of using statistical information for estimating when a fault may be occurring for at least one portion of a base station. In each example, the tail values of an expected distribution provide information regarding whether a deviation between an actual call activity level and an expected call activity level indicates a fault condition.

In one example, once a fault condition is detected, an appropriate indication of the fault condition is communicated to an appropriate portion of the network 44 such that corrective action can be taken.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of communicating, comprising:
    determining an expected relationship between call activity levels for a plurality of portions of a cell from observed activity levels during a selected learning time;
    determining actual call activity levels for at least some of the plurality of portions of the cell;
    determining an expected call activity level for a first portion of the cell based on the determined expected relationship and the determined actual call activity level of at least one other portion of the cell; and
    determining whether a difference between the determined actual call activity level for the first portion of the cell and the determined expected call activity level for the first portion is significant enough to indicate a fault with at least the first portion of the cell.

2. The method of claim 1, wherein the first and second portions each comprise a sector of the cell.

3. The method of claim 1, comprising automatically determining the expected call activity level for each portion by learning a pattern of call activity level for each portion.

4. The method of claim 1, comprising occasionally selecting a new learning time and determining a new expected relationship between the call activity levels of the portions based on the determined call activity levels during the new learning time.

5. The method of claim 4, comprising selecting a new learning time for each segment of time corresponding to a possible change in a call traffic pattern for the cell.

6. The method of claim 5, comprising
    selecting a plurality of segments of time corresponding to possible changes in the call traffic pattern; and
    determining a corresponding plurality of expected relationships.

7. The method of claim 6, comprising
    determining in which of the selected segments of time the determined actual call activity levels are; and
    using the corresponding determined expected relationship for determining the expected call activity level of the first portion of the cell.

8. The method of claim 5, wherein the segments of time correspond to at least one of a portion of a day, a day of a week, a month or a season.

9. The method of claim 1, comprising
    determining when the determined difference is statistically significant enough to indicate a fault condition for the first portion; and
    providing an indication of a fault condition for the first portion.

10. The method of claim 9, comprising setting a certainty factor for determining when the determined difference is statistically significant.

11. The method of claim 1, comprising determining which of the portions of the cell has the lowest call activity level and using that portion as the first portion.

12. The method of claim 1, comprising
    determining that there is no call activity for the first portion of the cell;
    determining that there is no call activity for any other portion of the cell; and
    determining whether a time during which there is no call activity for any of the portions of the cell indicates a fault condition for the entire cell.

13. The method of claim 12, comprising determining whether the determined time exceeds a predetermined threshold and providing an indication of a fault for the entire cell if the determined time exceeds the threshold.

14. The method of claim 1, wherein the fault comprises at least one of a failure or an abnormal behavior associated with the first portion of the cell.

15. The method of claim 1, comprising
    communicating an indication of a fault condition to another portion of a network associated with the cell.

16. A method of communicating, comprising;
    determining actual call activity levels for a plurality of portions of a cell;
    determining an expected call activity level for a first portion of the cell based on an expected, non-uniform distribution of call activity levels among the plurality of portions of the cell and the determined actual call activity level for at least a second portion of the cell; and
    determining whether a difference between the determined actual call activity level for the first portion and the expected call activity level for the first portion is significant enough to indicate a fault of at least the first portion of the cell.

17. The method of claim 16, wherein the first and second portions of the cell comprise one of channels or sectors of the cell.

18. The method of claim 16, comprising determining the expected, non-uniform distribution of call activity levels based on a preset target distribution of call activity among the portions of the cell.

19. The method of claim 16, comprising determining the expected, non-uniform distribution of call activity levels by observing call activity levels of each portion during a selected learning time.

20. The method of claim 16, comprising determining a plurality of the expected, non-uniform distributions for corresponding periods of time; and selecting one of the determined distributions for determining the expected call activity level of the first portion based upon a period of time in which the actual call activity levels are determined.

21. The method of claim 16, wherein the fault comprises at least one of a failure or an abnormal behavior associated with the first portion of the cell.

22. The method of claim 16, comprising communicating an indication of a fault condition to another portion of a network associated with the cell.

* * * * *